United States Patent [19]
Debe et al.

[11] Patent Number: 5,671,358
[45] Date of Patent: Sep. 23, 1997

[54] SYSTEM FOR VOTING STOCK COMPONENT INTERESTS

[75] Inventors: A. Joseph Debe, Garden City, N.Y.; Peter A. Broms, Glen Ridge, N.J.

[73] Assignee: Americus Stock Process Corp., Wilmington, Del.

[21] Appl. No.: 294,439

[22] Filed: Aug. 23, 1994

Related U.S. Application Data

[63] Continuation of Ser. No. 945,101, Sep. 15, 1992, abandoned, which is a continuation-in-part of Ser. No. 631,324, Dec. 20, 1990, abandoned.

[51] Int. Cl.[6] .............................. G06F 17/60; G06G 7/52
[52] U.S. Cl. ................................. 395/201; 395/212
[58] Field of Search ................................. 364/400, 401, 364/406, 408; 395/201, 212

[56] References Cited

U.S. PATENT DOCUMENTS

| | | |
|---|---|---|
| 4,093,276 | 6/1978 | Debe . |
| 4,412,287 | 10/1983 | Braddock, III . |
| 4,674,044 | 6/1987 | Kalmus et al. . |
| 4,823,265 | 4/1989 | Nelson . |

OTHER PUBLICATIONS

Eckerson, Wayne, "Users Enthused about Electronic Meetings" Network World, v9 n24 pp 43 Jun. 15, 1992.
Numri, Hanna, "Secret Ballot Electrons in Comp. Network" Comp & Sec. v10 n6, pp. 553–560 Oct. 1991.
Sebestyen, Istvan et al.; "Public Videotex–A Demo. Use of New Tech." Comp. Wld v17 n92 Oct. 1983.

*Primary Examiner*—Gail O. Hayes
*Assistant Examiner*—George N. Stevens
*Attorney, Agent, or Firm*—Felfe & Lynch

[57] ABSTRACT

A data processing system for processing the voting of partial stock interests via equity and options, comprising computer means for determining and storing component factors for equity and for calculating and storing component factors for options and vote component factors corresponding to each of said component factors for options, wherein each said vote component factor is indicative of the right to receive a partial vote attributed to each of said component factors for options, wherein said component factors for options are at least two of: (i) a component interest indicative of the right to receive a partial share of stock equal in value to a stipulated price or a full share of stock of the company on a predetermined future date, whichever is the lesser value; (ii) a component interest indicative of the right to receive a partial share of stock equal in value to the appreciation, if any, of the share of stock above the stipulated price on the predetemined date; (iii) a component interest indicative of the right to receive substitute payments equal in amount to dividends declared with respect to a given date which is prior to the predetermined future date and which goes to zero value at the predetermined future date.

16 Claims, 9 Drawing Sheets

SYSTEM FOR VOTING STOCK COMPONENT INTERESTS

This application is a continuation of application Ser. No. 945,101, filed Sep. 15, 1992 now abandoned, which is a continuation-in-part of application Ser. No. 631,324, filed Dec. 20, 1990 now abandoned.

BACKGROUND OF THE INVENTION

This invention relates to a system for voting in accordance with component interests of a share of stock in two or three separately tradeable components. In the three component case they may be called DIVS[SM], SPECS[SM], and ZIPS[SM]. It is anticipated that these components will be created relating to the common stock of large "Blue Chip" corporations in arrangements having a series term of approximately five years. However, any time period could be designated. The characteristics of these components are as follows:

DIVS[SM]—This component gets a substitute payment equal to the dividends paid on the common stock over the term of the series. It is anticipated that the initial market pricing of the DIVS[SM] will approximate the discounted present value of the applicable nominal dividend rate using the yields on Treasury Notes of comparable maturity as the discount rate. Historic and prospective dividend growth rates of individual stocks will be factored in to lower or increase the dividend discount rate actually used. The return to the DIVS[SM] holder must take into account the fact that the initial investment or cost of the DIVS[SM] will end up with a zero value at termination. Therefore, a significant portion of the dividends received by the DIVS[SM] holder represents a return of the initial investment. The dividends to the DIVS[SM] holder preferably will be paid in the same amount and at the same time as the dividends are paid on the underlying common stock.

SPECS[SM]—This component is entitled to any and all appreciation in the stock's price above the Termination Claim[SM] at maturity. Unlike conventional options where the strike price (Termination Claim[SM]) must be paid in order to obtain the common stock at expiration, the holder of SPECS[SM] will receive shares of common stock in satisfaction of their claim at termination. If the common stock's price closes below the Termination Claim[SM] at expiration, the SPECS[SM] will be worthless. Even in that eventuality, however, the SPECS[SM] will have provided investors with innumerable profit making opportunities during the five year period. Their utility results from the fact that they embrace most of the volatility of the common stock because of their significant leverage, thus appealing to speculative investors.

ZIPS[SM]—This component represents the nucleus of the common stock preferably collateralized at all times by the value of a full common share because of its preferential claim at termination. The initial investment in the ZIPS[SM] will be considerably less than the price of the underlying common stock because of the value attributable to the DIVS[SM] and SPECS[SM]. Investment return on the ZIPS[SM] will be entirely from preferential price appreciation to the lesser of the stock's price or the Termination Claim[SM] at maturity. Investors in the ZIPS[SM] of dividend-paying common stocks will end up with an income-producing investment at termination. A method preferably is utilized (by ASPC) for establishing the Termination Claim[SM] and Termination Date[SM] in order to achieve conservative investment objectives of (1) a stand-still return to the stock's current price at least as great as the yield on Treasury Notes of comparable maturity, and (2) a margin of safety or downside price protection of at least 25% to 33%. Once these criteria have been satisfied, it should be possible to determine with considerable accuracy the much higher potential returns to the Termination Claim[SM]. The capital conservative aspects of the ZIPS[SM] results from the fact that they should be available initially at a significant discount from the prevailing price of the common stock while offering investors the prospects of achieving significant potential returns.

Both the DIVS[SM] and ZIPS[SM] are completely new investment securities which should have wide appeal to investors, most of whom are risk averse. This will enhance the value of the underlying common stock. All three components will trade in the marketplace and their actual prices will be determined as any publicly traded vehicle.

An important unique aspect of this system is that the vote on the underlying common stock is apportioned on a pro rata basis to each component. If all three components are trading, each gets its vote based on its value relative to the sum of the values of all three components together. There has never before been a way to split the vote of a share of stock. In the case of the components trading as options, never before have the options had a vote. The programmed computer systems that implement the vote apportionment and assure that the vote is properly delivered to each ZIPS[SM], SPECS[SM] and DIVS[SM] holders and to the corporation are described hereinafter. In the case of two component trading, the apportionment is based on the value of each component relative to the value of the underlying common stock.

There are described three methods of creating ZIPS[SM], DIVS[SM], and SPECS[SM], as follows:

Equity Creation Mode.

In this mode the components will be created by the owner of the underlying common stock selling one or more components and pledging his or her stock to an equity clearing corporation (ECC). The ECC will then deliver the number of components sold to the Depository Trust Corporation (DTC) that are then held by DTC in "street name" in the buyer's DTC participant account for the benefit of the buyer. The pledge to the ECC is done to insure delivery of the interests represented by the sold components prior to and upon termination of the series. In this mode the components preferably trade on an equity exchange. The trading of the components would take place with trade matching and settlement handled identically to the equities.

Option Creation Mode.

In this mode the components will be created as options by the sale of one or more components. In this case, however, they would be created by an option clearing corporation (OCC), and there would be no direct pledge of the underlying common stock. The OCC participant would have to maintain margin at OCC to cover the created component. In this mode the OCC interposes itself between the buyer and seller guaranteeing delivery of the components, just as it now does in option trades.

Corporate Exchange and Creation Mode.

In this mode a corporation would exchange components for its common stock as a service to its shareholders. The most important difference between this mode and the Equity Creation Mode is that all three components will be created at the same time, i.e., at the time of exchange, and be deposited in the stockholder's DTC participant account. The settlement of the traded components would be handled by DTC and National Securities Clearing Corporation (NSCC) in the same manner as applies to equity trades currently.

In the corporate creation mode a corporation could raise equity capital more economically by issuing ZIPS$^{SM}$, SPECS$^{SM}$ and DIVS$^{SM}$ instead of selling common stock the conventional way. The components would be bought by new or existing investors in the company. Trading of the components would also be handled as equities. Instead of purchasing the common stock, investors would buy individual components.

Unlike the Equity Creation or Option Creation modes where early redemption by purchasers is not allowed, the Corporate Creation and Exchange Mode would allow the holder of all three components to exchange them for the underlying common stock at anytime during the term of the arrangement. The combined components in the Corporate Exchange and Creation Mode are less likely to sell at a discount to the underlying common stock, than in the other two modes, because of the availability of the redemption feature. However, because of the significant increase in investment utility and capital efficiencies provided by the availability of the DIVS$^{SM}$, ZIPS$^{SM}$ and SPECS$^{SM}$, investors should see either meaningful premiums for the components in the Corporate Exchange and Creation Mode or continued creations in the other two modes.

In all of the creation modes a Settlement Date$^{SM}$ (SD$^{SM}$) and Termination Claim$^{SM}$ (TC$^{SM}$) must be established before trading can commence.

The splitting of shares of stock described herein is an important improvement over the PRIME® and SCORE® system described in U.S. Pat. No. 4,093,276 and claimed as a stock certificate. In the original system the PRIME® received all the dividends, price appreciation up to the Termination Claim$^{SM}$, and the entire vote. The SCORE® only received the appreciation above the Termination Claim$^{SM}$. That system demonstrated the value added in terms of the components' premium over the underlying common stock and increased liquidity both volume-wise and dollar-wise relative to the common stock displaced. Thus, there are sound reasons to believe that DIVS$^{SM}$, ZIPS$^{SM}$ and SPECS$^{SM}$ should attract considerable new investor interest in the individual components which will thereby increase the demand and the market value of the underlying common stock.

Some of the improvements of the new system are:

1. By splitting the vote among all the components the new system assures that the vote will have an appropriate value relative to the underlying common stock.
2. This system represents the ultimate splitting of the common stock, since each economic interest of the stock is represented by separately traded components.
3. The new system represents the first time that dividends or substitute dividends on a share of stock will be able to trade on a public exchange.
4. There preferably are no administrative or investment fees in the new system.
5. There preferably are no underwriter or underwriter fees in the new system.
6. The yield on the ZIPS$^{SM}$, due to price appreciation only, is much easier to determine than for the PRIME® since the PRIME® receives price appreciation, dividends, and dividend increases.
7. The splitting has value added as demonstrated by Americus Trust's PRIME®s and SCORE®s. This value stems from the increased investment utility of the components and the capital efficiency that results from the ability of investors to commit capital only to the desired components. The value added can also be attributed to savings in transaction costs that would be required in attempts to replicate the investment characteristics of the individual components.
8. The ZIPS$^{SM}$ is a safer investment than the PRIME®, and much safer than the underlying common stock, since the common stock's price (if held to the termination of the series) can fall by the value of the SPECS$^{SM}$ and the DIVS$^{SM}$ before the ZIPS$^{SM}$ could lose any value. There follow definitions of terms used herein.

ASPC—Americus Stock Process Corp. (Applicants' assignee, owner of primary computer)

ZIPS$^{SM}$—Zero Income Principal of Stock

DIVS$^{SM}$—DIvidend Value of Stock

SPECS$^{SM}$—Speculative Equity Component of Stock

OCC—An options clearing corporation

ECC—An equities clearing corporation

DTC—Depository Trust Company

NSCC—National Securities Clearing Corporation

CUSIP—A string of digits and letters that uniquely identifies every security that trades on the exchanges.

Series—the ZIPS$^{SM}$, DIVS$^{SM}$ and SPECS$^{SM}$ for a particular company with a given Termination Claim$^{SM}$ and Termination Date$^{SM}$.

Termination Claim$^{SM}$—The value that determines how the common stock underlying a series will be distributed between the ZIPS$^{SM}$ and SPECS$^{SM}$ component holders. ZIPS$^{SM}$ holders will receive common stock equal to the lesser of the Termination Claim$^{SM}$, or the stock's price, with holders of the SPECS$^{SM}$ component receiving the remaining stock, if any, equal in value to the excess of the stock's price above the Termination Claim$^{SM}$.

Termination Date$^{SM}$—The last day of trading of the components which will determine the basis for distribution of the underlying common stock.

The terms Firm, Member Firm and OCC Participant are interchangeable in the option mode.

In the Equity mode and Corporate Creation and Exchange mode the terms Firm, Member Firm and ECC Participant are interchangeable.

SUMMARY OF THE INVENTION

In accordance with the invention, a system for voting options each of which represents an interest in a share of stock of an entity, comprises computer input and memory means for allocating to a customer's account options that are any of: (a) a component interest indicative of the right to receive a partial share of stock equal in value to a stipulated price or a full share of stock of the entity on a predetermined future date, whichever is the lesser value; (b) a component interest indicative of the right to receive a partial share of stock equal in value to the appreciation, if any, of the share of stock above the stipulated price on the predetermined date; (c) a component interest indicative of the right to receive substitute payments equal in amount to dividends declared with respect to a given date which is prior to the predetermined future date and which goes to zero value at the predetermined future date; and computer data processing means for allocating the right to vote the options among the three component interests.

For a better understanding of the invention, together with other and further objects thereof, reference is made to the following description, taken in connection with the accompanying drawings, and its scope will be pointed out in the appended claims.

Figure 2:
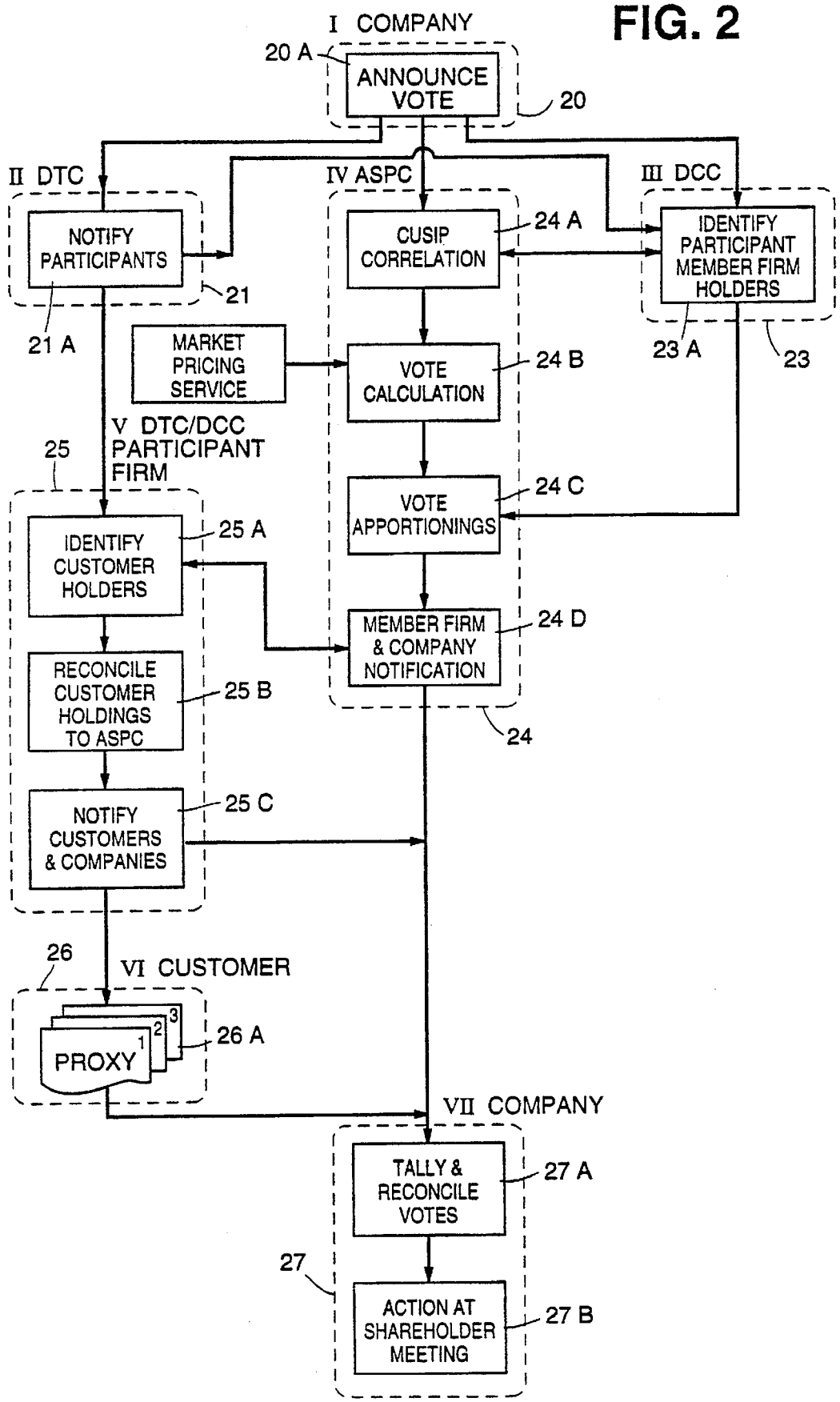
FIG. 2 is a schematic diagram of the overall system outlining the relationships and flows of data among units involved in this invention.
Figure 3:
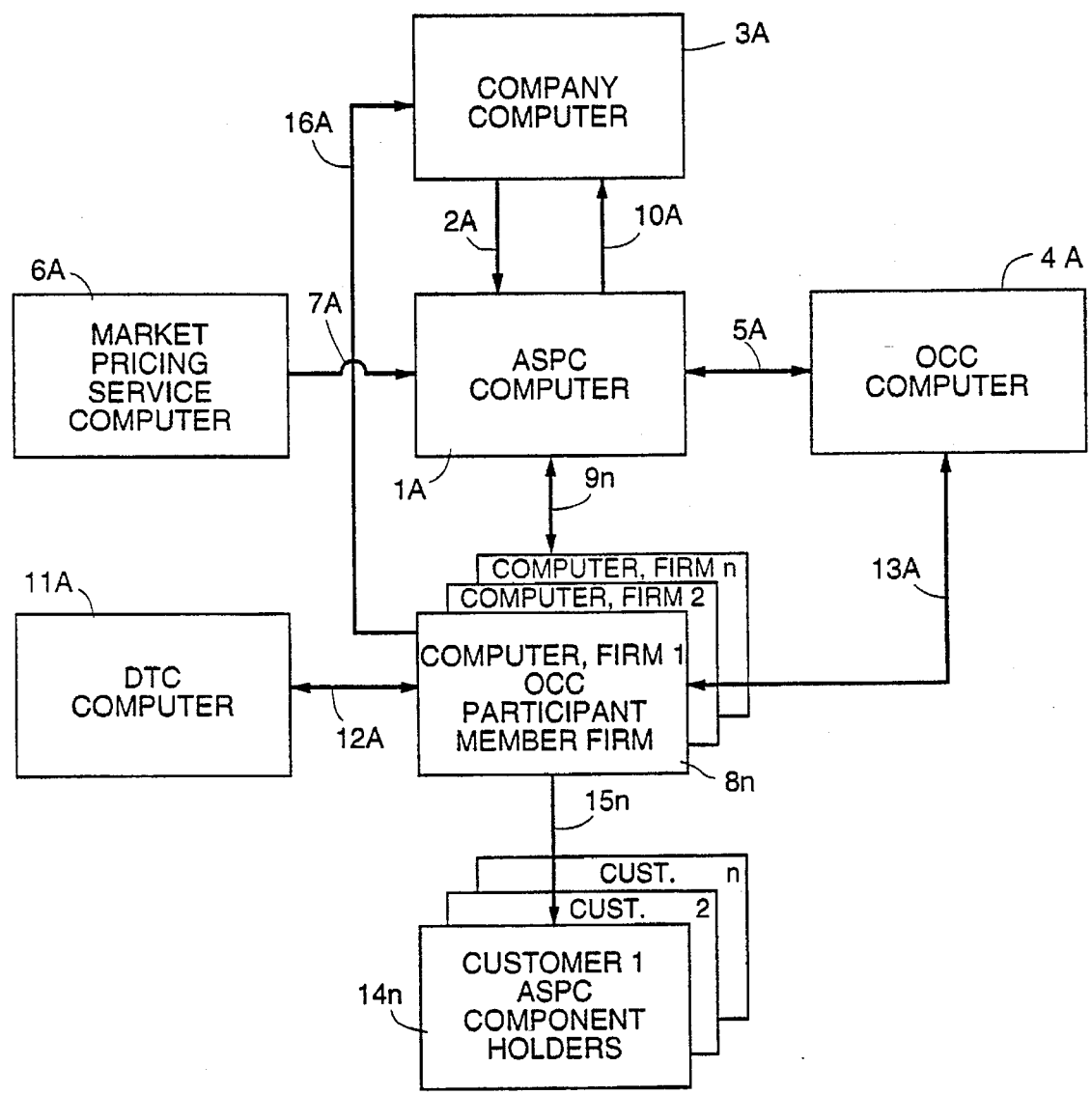
FIG. 3 is a schematic diagram of the system which shows the interaction of the several related computer systems.

Before referring to the drawings in detail, it will be understood that for purposes of clarity, each computer apparatus represented in block diagrams in FIG. 2 and 3 utilize, for example, a digital computer processor which includes such hardware as a central processing unit, program and random access memories, timing and control circuitry, input-output interface devices and other conventional digital subsystems necessary to the operation of the central processing unit as is well understood by those skilled in the art. Magnetic memory storage disks (hard drive) are also utilized. The processors operate according to the computer programs produced according to the flow charts represented in the drawings.

Figure 1:
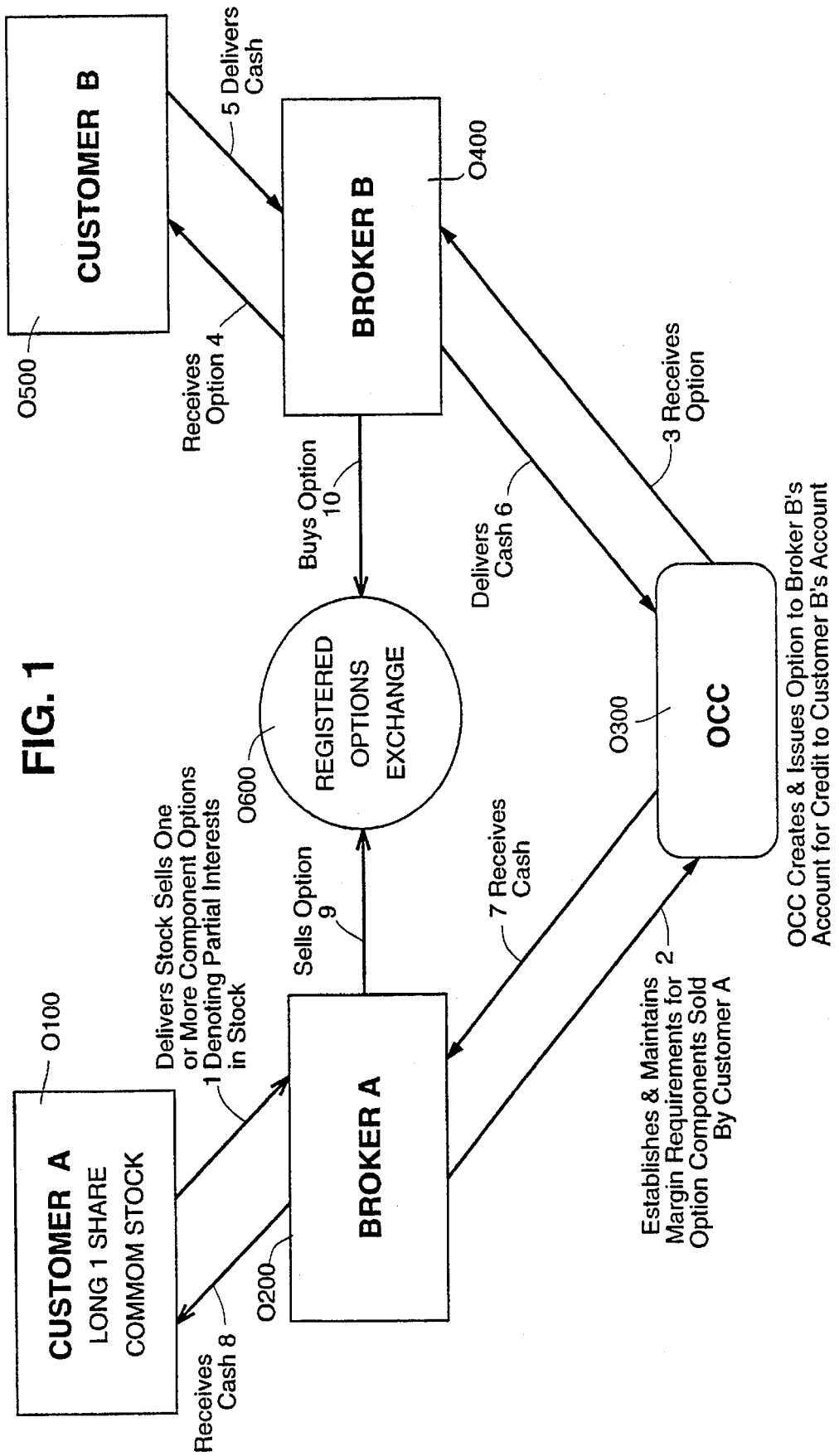
FIG. 1 (OPTION MODE CREATION TRADE) and FIG. 1a (DATA FLOW DIAGRAM FOR OPTION MODE CREATION TRADE) are schematic diagrams showing the creation of components and data flow in the option mode.

Referring now to FIG. 1 of the drawings, there is represented diagrammatically a transaction involved in the creation and trading in the option mode of one or more DIVS$^{SM}$, SPECS$^{SM}$ or ZIPS$^{SM}$.

As represented in FIG. 1, a system for creating options, each of which represents an interest in a share of stock of an entity comprises computer input and memory means for allocating to a customer's account options that are any of: (a) a component interest indicative of the right to receive a partial share of stock equal in value to a stipulated price or a full share of stock of the entity on a predetermined future date, whichever is the lesser value; (b) a component interest indicative of the right to receive a partial share of stock equal in value to the appreciation, if any, of the share of stock above the stipulated price on the predetermined date; (c) a component interest indicative of the right to receive dividends declared with respect to a given date which is prior to the predetermined future date and which goes to zero value at the predetermined future date. The computer means will be described more fully with reference to FIGS. 6 and 8. The system also includes computer memory means for recording the sale from the customer's account of options that are any of components (a), (b), (c), as described more fully with reference to FIG. 1a.

As represented diagrammatically in FIG. 1, Box 0100, Customer A is long one share of common stock, by which it is meant that he owns common stock carried in his account at Broker A (Box 0200). As represented by arrow 1, Customer A represented by Box 0100 sells one or more options for DIVS$^{SM}$, ZIPS$^{SM}$ or SPECS$^{SM}$ through Broker A, represented by Box 0200.

The sale by Customer A, through Broker A, is done on a registered option exchange, represented by Box 0600. This exchange preferably has standardized contract specifications arranged in conjunction with the owner of the primary computer (ASPC). As indicated by arrow 2, Broker A establishes and maintains margin (at OCC) for any option component sold by Customer A. OCC creates and issues an option to Broker B's account, represented by Box 0400 for credit to Customer B's account, represented by Box 0500. As represented by arrow 3, Broker B receives the option and as represented by arrow 4, Customer B receives the option. As represented by arrow 5, Customer B delivers cash to Broker B, who as represented by arrow 6, delivers cash to OCC. As indicated by arrow 7, Broker A receives cash from OCC and as represented by arrow 8, Customer A 0100 receives cash for the option he has sold.

As represented by arrow 9, the sale of the option by Broker A is through a registered options exchange 0600. Broker B buys the option from Broker A through the registered options exchange 0600, as indicated by arrow 10.

Figure 1A:
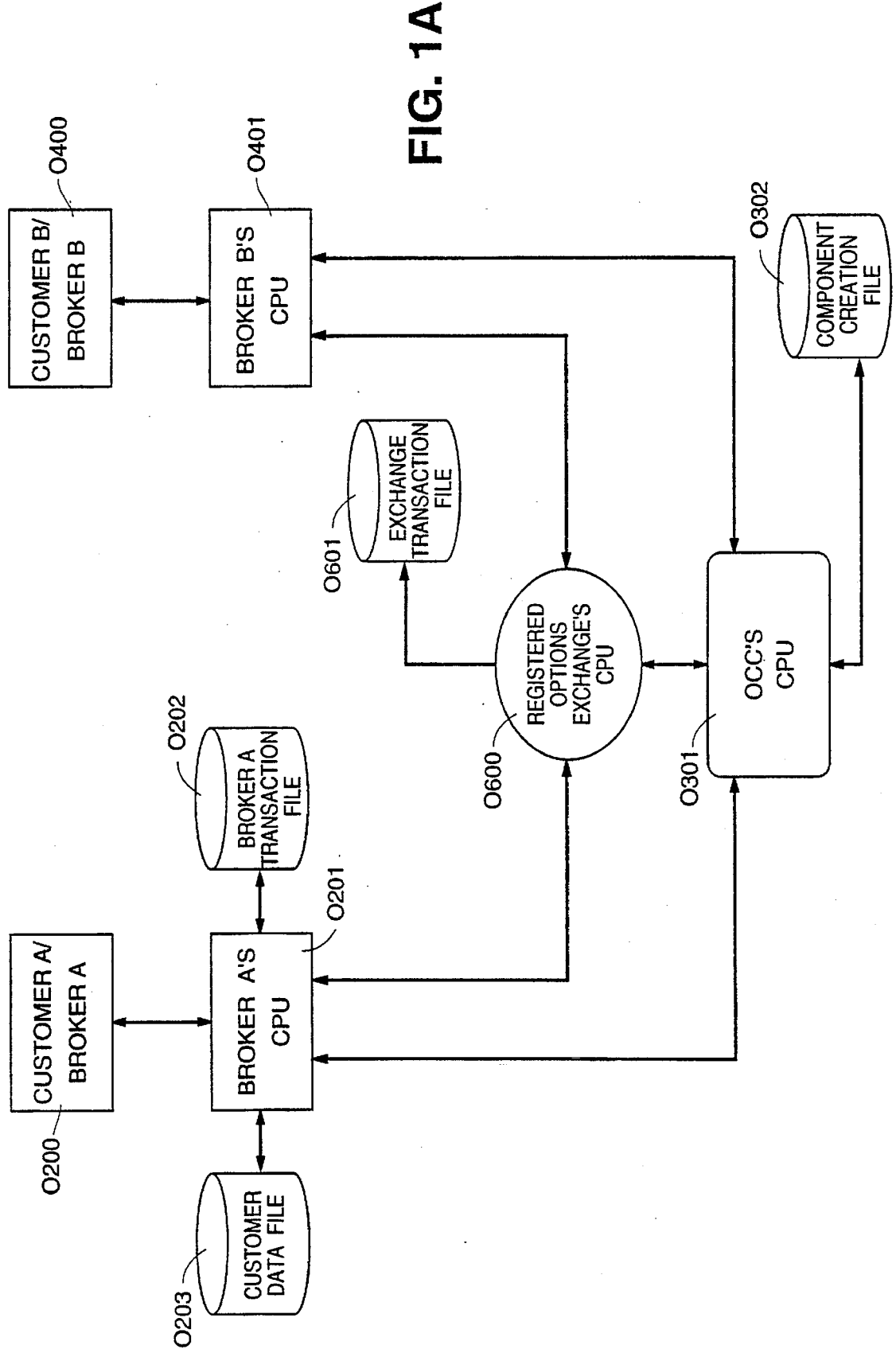

Referring now to FIG. 1a, customer A establishes an account with Broker A 0200 and deposits shares of a company's common stock in his account with Broker A. Broker A 0200 then stores information about Customer A and his stock positions in a magnetic memory disk file 0203 in his computer system 0201.

Customer A instructs Broker A to sell a component option interest in a common stock.

Broker A's computer 0201 queries his account information memory disk file 0203 for Customer A to ascertain that Customer A has the underlying common stock in his account for the component being sold and created.

Assuming the underlying common stock is there, Broker A enters into his computer transaction file 0202 an order to sell the component as an opening transaction. The floor traders for each customer upon completion of the trade enter the trade in each of their computer systems 0201 and 0401, and the specialist enters information about the trade into the exchange's computer exchange transaction file 0601 which may be stored in a memory storage disk. Customer A's account on the broker's computer system is updated to show that he is short the component sold when confirmation of the sale is received from the registered options exchange. Each broker's computer systems then generate reports for Broker A 0200 and Broker B 0400 indicating the results of the trade. Then the brokers report the trade to their respective customers.

When a trade is complete the exchange's computer systems transmit data about the trade to the computer system at an option clearing corporation (OCC) 0301. This computer system accumulates all opening and closing trades for each component by broker. The OCC component creation file 0302, which may be stored in a memory storage disk, registers the component which OCC has created.

For each opening sale of a component OCC's computer system 0301 causes a component option to be created in the computer record of the buying broker's account 0401 to complete the trade. After the close of trading OCC's computers transmit a report showing the net change in position for each component that each broker traded that day. The broker's computer systems reconcile this net change with the trades the broker made that day. When this is finished the individual customer's account information, stored in the broker's computer system, such as Broker A's transaction file 0202, which may be stored in a memory storage disk 0202, is updated to reflect the trades the customer's made that day. Each day OCC and the participant member firms adjust maintenance margins to reflect the change in value of the net position they have in component options at OCC.

Referring now to FIG. 2, a Company 20 utilizes computer means 20A for announcing its intent to solicit votes from its stockholders. The computer means 20A communicates with computer means 21A for notifying participant members of Depository Trust Corporation (DTC) 21 which, on behalf of its participant members may serve as the repository for the company's equity. As it learns of shareholder voting matters, the computer means 21A disseminates this information to its participants. For example, the DTC computer means 21A notifies OCC 23 and the DTC/OCC participant firm 25.

The OCC participant firm 25 has computer means 25A for identifying customer holdings, computer means 25B for reconciling component holdings (long and short) to ASPC and computer means 25C for notifying customers and the company.

An Options Clearing Corporation (OCC) 23 maintains records that identify all holders (long and short option contracts) of ZIPS$^{SM}$, SPECS$^{SM}$ and DIVS$^{SM}$. OCC 23 utilizes computer means 23A for identifying participant member holdings.

ASPC 24, owner of the primary computer, utilizes computer means for CUSIP correlation which is necessary to properly apportion component-holder voting rights. ASPC requests from OCC via computer means 23A information that identifies participant holders of record of either long and/or short positions for specified components pertinent to a shareholder vote.

ASPC 24, the owner of the primary computer has computer means for performing four basic tasks in order to establish the voting rights for eligible component-holders:

1. CUSIP correlation computer means 24A for correlating the equity at issue to the corresponding created components: SPECS$^{SM}$, ZIPS$^{SM}$ and DIVS$^{SM}$;
2. vote calculation computer means 24B for calculating the proper voting rights for each of these components;
3. vote apportioning computer means 24C for apportioning the correct number of votes to each OCC participant (as identified by OCC) for each component;
4. computer means 24D notifies all OCC participant members, maintaining component positions of their voting rights.

The OCC participant firm 25, upon receipt of the voting information utilizes a similar computer system to that of ASPC to further apportion the net long and net short vote among its customers as previously described. Ultimately proxies are forwarded to all eligible holders identifying the customer's 26 detailed, as well as net, voting rights.

The customer 26 votes and returns a proxy 26A to the company 27. The company 27 utilizes computer means 27A for tallying and reconciling all votes submitted and, as indicated by Box 27B, takes corresponding action at its shareholder meeting.

Referring now to FIG. 3 of the drawings, a company computer 3a or public channels 2a enters relevant information concerning a stockholder vote into the ASPC computer 1a. This information indicates that company 3a wishes to solicit votes from its stockholders.

On the stock of record date the ASPC computer 1a initiates a request for data from the OCC computer 4a in order to identify member firms holding positions of all components. This communication occurs over a communication link 5a. This will be explained more fully in connection with FIG. 4.

The ASPC computer 1a then calculates the pro rata voting right applicable to each of the components (as more fully explained in connection with FIG. 5). In order to accomplish this, the ASPC computer receives market pricing data from an external market pricing service computer 6a by means of an electronic medium communicated through a communication link 7a.

The ASPC computer next apportions the net long and net short votes among the holders of record identified by OCC (as will be described in more detail in connection with FIG. 6) and notifies all such OCC participants 8n of their net applicable long and/or short votes via a communication link 9n. While only one OCC participant 8n and one communication link 9n are represented in FIG. 3, it will be understood that a plurality of firms are in data communication with the ASPC computer 1. The total number of partial interests and corresponding votes apportioned among the OCC participants is then communicated over a link 10a to the company computer 3a, as will be explained more fully in connection with FIG. 7.

The OCC participant member's computer 8n additionally receives data directly from DTC's computer 11a via communication link 12a as well as the OCC computer 4a via communication link 13a to account properly for all its customers' holdings, including the ASPC-created components, and to apportion voting rights correctly among its customers for the specific vote solicitation, as will be explained more fully in connection with FIG. 8. Individual customers 14n are sent proxies by established means 15n and the total number of proxies (votes) distributed is reported to the company computer 3a as required over link 16a. From this point the standard vote solicitation is made by the company.

Figure 4:
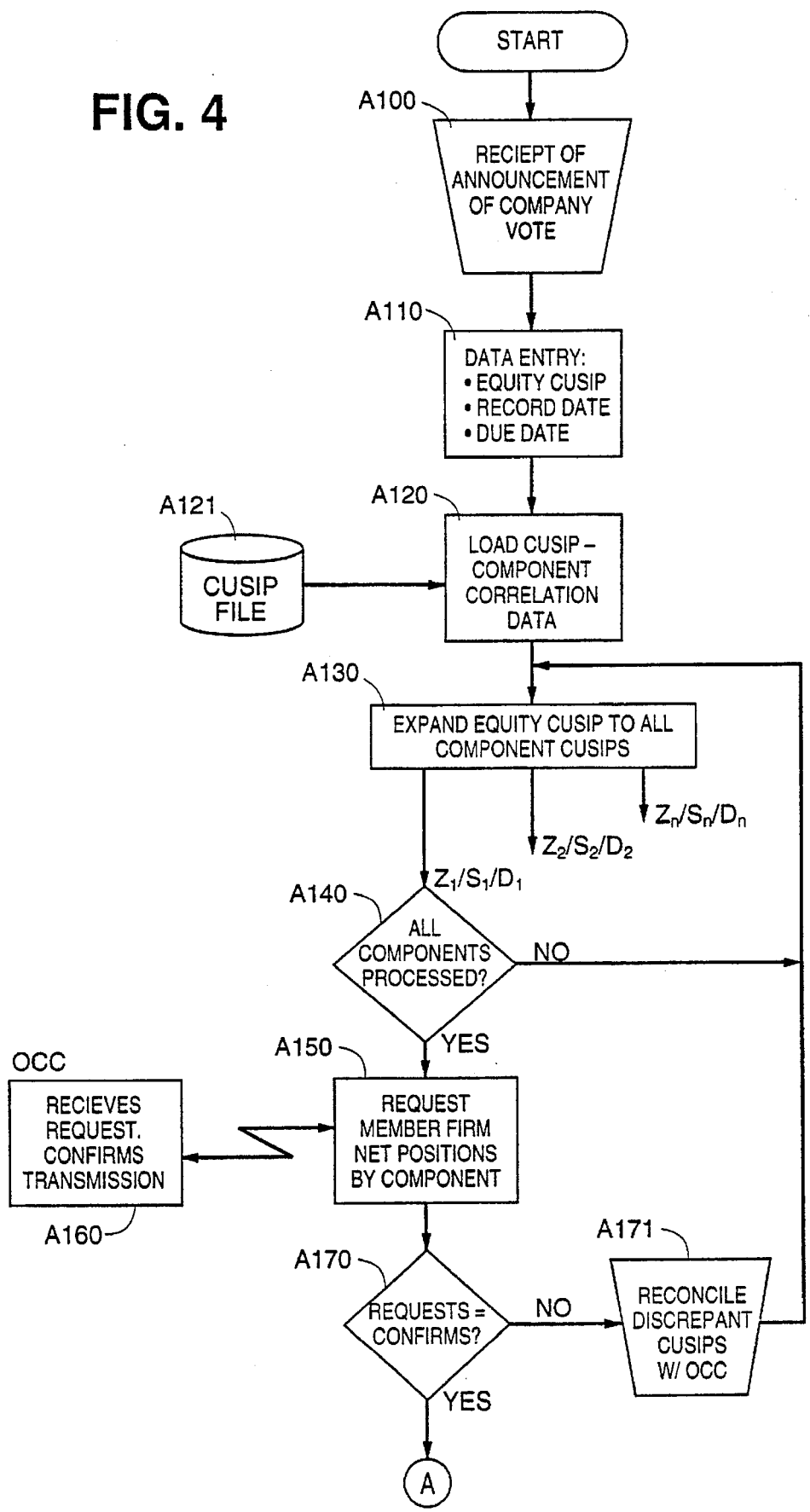
FIG. 4 is a flow chart comprising a representation of a portion of a computer which operates according to a computer program produced according to the flow chart for CUSIP CORRELATION at, for example, a primary computer.

Referring now to FIG. 4, the ASPC CUSIP correlation computer will be described with reference to the flow chart. The ASPC computer includes a computer portion A100 for receiving an announcement of a shareholder vote to be taken by a company.

The ASPC computer includes means for manually entering pertinent data concerning the vote to initiate operation of the system. This data includes the equity CUSIP number, the record date and the due date.

A CUSIP file or memory storage means, for example a computer disk, A121 is loaded into a computer portion A120 for loading CUSIP component correlation data. This is done in order to match the equity with its multiple ZIPS$^{SM}$, SPECS$^{SM}$ and DIVS$^{SM}$ for each of the Annual and/or Termination Claim$^{SM}$ Series (there being at least one series anticipated per year of maturity). The CUSIP correlation file contains a unique CUSIP number for every series component created by ASPC.

The ASPC computer comprises a portion A130 for expanding the equity CUSIP to all component CUSIPs. The computer portion matches the equity CUSIP with the component CUSIP numbers. These have been denoted $Z_1$, $S_1$ and $D_1$, respectively, for the ZIPS$^{SM}$, SPECS$^{SM}$ and DIVS$^{SM}$ of year$_1$, respectively, and continuing through year$_n$.

The ASPC computer includes a portion A140 for inquiring "are all components processed?" The portion A140 has a "no" output which is connected back to the input of portion A130 for repeating the matching of the equity CUSIP with the component CUSIP numbers until all the related component CUSIP numbers have been found for the requested equity CUSIP.

The "yes" output of the computer portion A140 is coupled to a "request member firm net positions by component" computer portion A150 which requests from OCC the identification of all OCC participant members holding any positions of any of the above mentioned component CUSIP numbers.

The OCC computer portion A160 receives the request and returns confirmation of the requested identification to ASPC computer portion 150. A "requests=confirms?" computer portion A170 insures that the data requested is consistent with the data confirmed. If not, computer portion A171 is means for manually reconciling any discrepancy and the OCC computer portions repeat their operation until the data requested is consistent with that which has been confirmed.

Figure 5:
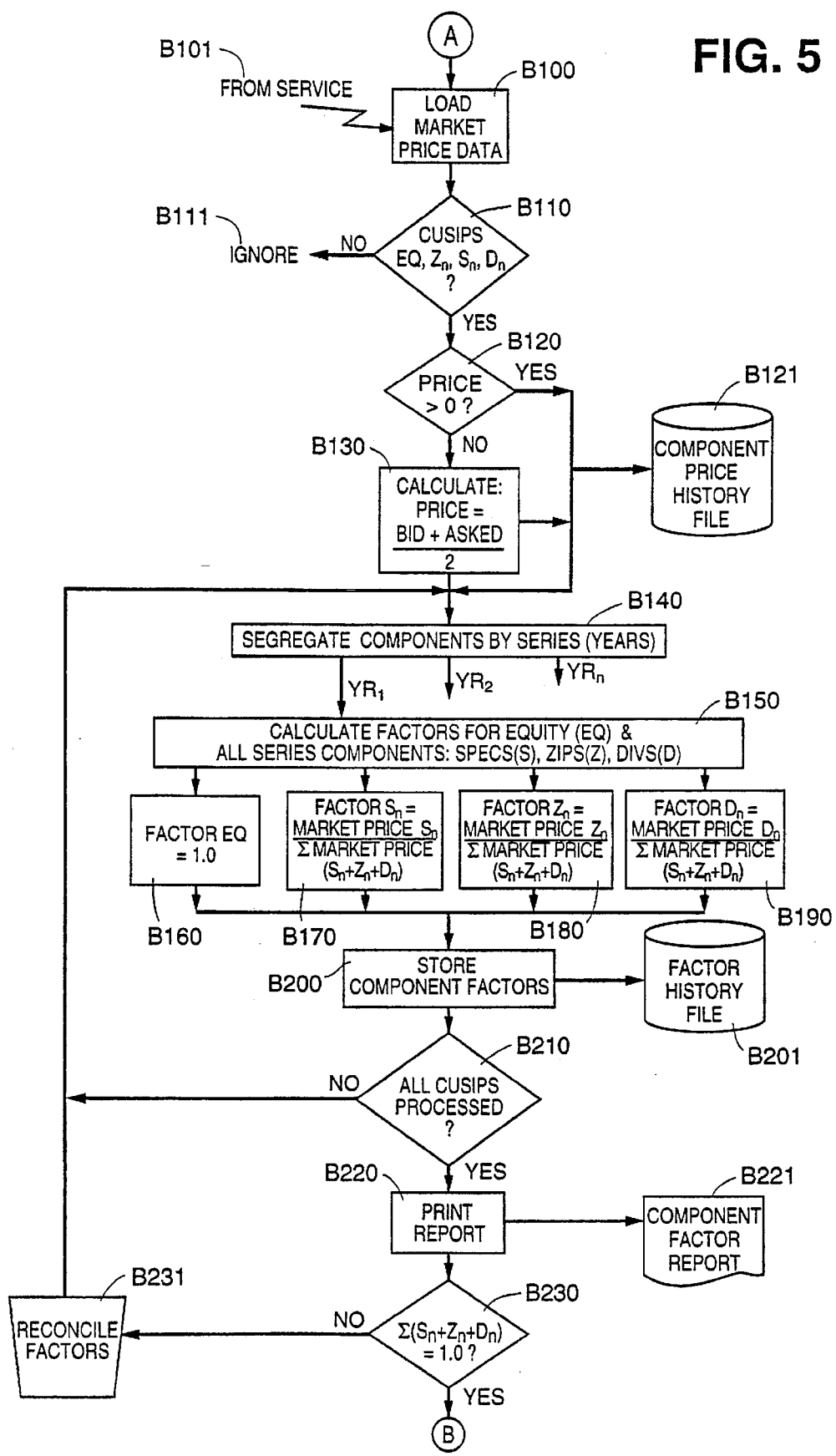
FIG. 5 is a flow chart comprising a representation of a portion of a computer which operates according to a computer program produced according to the flow chart for VOTE CALCULATION at, for example, the primary computer.

The "yes" output of the computer portion A170 is connected to the ASPC vote calculation computer portion represented in FIG. 5. The vote calculation computer portion includes a "load market price data" computer portion B100 for loading the market price data supplied from a service B101 into the system to begin the vote calculation. The pricing preferably is the closing market price as of the close on the stock of record date on any exchange where traded, or as determined by specific contract agreements.

The computer portion B100 is coupled to a "CUSIP=EQ, $Z_n$, $S_n$, $D_n$?" computer portion B110. Computer portion B110 determines that only CUSIP numbers with any claim to a voting right are considered (denoted as EQ, $Z_n$, $S_n$ and $D_n$ for the equity, ZIPS$^{SM}$, SPECS$^{SM}$ and DIVS$^{SM}$ for all series, respectively). All other CUSIP numbers are ignored, as indicated by the "no" output to B111 "ignore" computer portion from portion B110.

A "is price greater than 0?" computer portion B120 determines if a market price exists for a CUSIP (that is, its price is greater than zero dollars). The "yes" output of computer portion B120 is coupled for storage to the component price history file computer portion B121 which may be, for example, a computer storage disk.

The "no" output of the computer portion B120 is coupled to a $$\text{"calculate: price} = \frac{\text{bid} + \text{asked"}}{2}$$

computer portion B130. If any equity or component is not traded on a given day (that is, its price is either absent or zero), computer portion B130 calculates its value by determining the mean of the bid and asked prices. This computed value is stored in the component price history file B121.

The output of computer portion B130 is coupled to a "separate components by series (years)" computer portion B140. In order to establish component voting rights, computer portion B140 groups all components by series (that is, by Termination Date$^{SM}$ and/or Termination Claim$^{SM}$ in which they mature). The outputs of computer portions B140 are coupled by year, that is, $YR_1$, $YR_2$ ... $YR_n$ to computer portion B150 "calculate factors for equity (EQ) & all series components: SPECS$^{SM}$ (S), ZIPS$^{SM}$ (Z), DIVS$^{SM}$ (D)," computer portion B150. Within each series, the computer portion B150 segregates the individual components so that unique component factors can be calculated for each. A "factor EQ=1.0" computer portion B160 sets the component factor for the equity at 1.0.

A $$\text{"factor } S_n = \frac{\text{market price } S_n}{\Sigma \text{ market prices } (S_n + Z_n + D_n)}\text{"}$$

computer portion B170 determines the component factor for the SPECS$^{SM}$, for the year$_n$ by dividing the market price of the SPEC$^{SM}{}_n$ by the sum of the market prices for each of the ZIPS$^{SM}$, SPECS$^{SM}$ and DIVS$^{SM}$ for the same year$_n$.

A $$\text{"factor } Z_n = \frac{\text{market price } Z_n}{\Sigma \text{ market prices } (S_n + Z_n + D_n)}\text{"}$$

computer portion B180 determines the component factor for the ZIPS$^{SM}$ for the year$_n$ by dividing the market price of the ZIPS$^{SM}{}_n$ by the sum of the market prices for each of the ZIPS$^{SM}$, SPECS$^{SM}$ and DIVS$^{SM}$ for the same year$_n$.

A $$\text{"factor } D_n = \frac{\text{market price } D_n}{\Sigma \text{ market prices } (S_n + Z_n + D_n)}\text{"}$$

determines the component factor for the DIVS$^{SM}$ for the year$_n$ by dividing the market price of the DIVS$^{SM}{}_n$ by the sum of the market prices for each of the ZIPS$^{SM}$, SPECS$^{SM}$ and DIVS$^{SM}$ for the same year$_n$.

A "store component factors" computer portion B200 then stores the component factors in a factor history file B201, which may be a computer disk.

The computer portion B200 is also coupled to an "all CUSIPS processed?" computer portion B210, having a "no" output coupled to the input of the B140 computer portion for continuing the operation of the computer until all CUSIPS eligible for voting rights have been calculated and stored.

The "yes" output of the computer portion B210 is coupled to a print report computer portion B220 for printing a component factor report B221, to allow inspection of the data.

As a system control check, a computer portion "$\Sigma$ ($s_n$+$z_n$+$d_n$)=1.0?" computer portion B230 has a "no" output coupled to a "reconcile factors" computer portion B231, which is coupled to the input of computer portion B140. The factors are manually reconciled in computer portion B231, adjustments are made and the computer operation is repeated until the sum equals 1.0. The computer cannot continue its operation until this condition is met.

Figure 6:
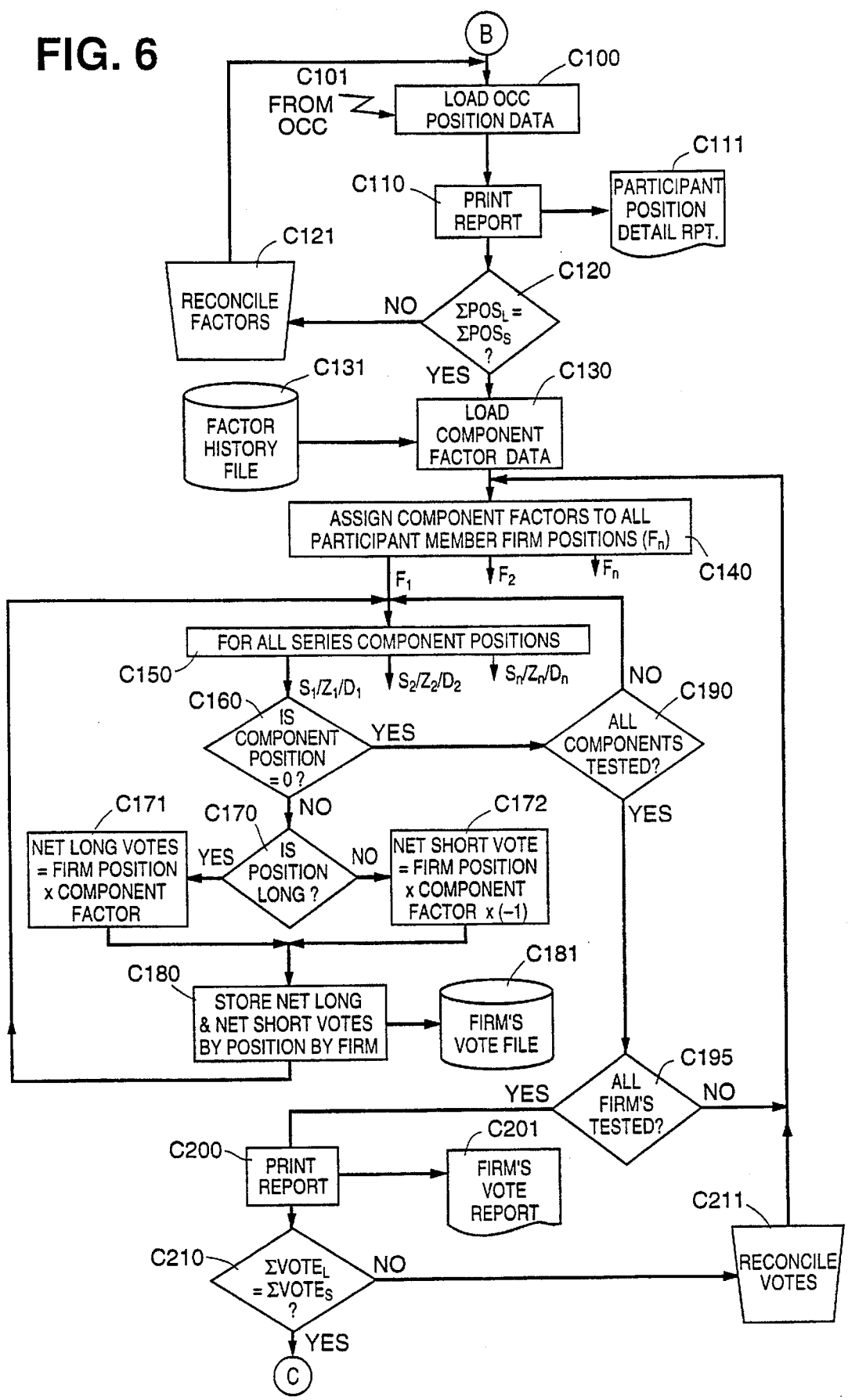
FIG. 6 is a flow chart comprising a representation of a portion of a computer which operates according to a computer program produced according to the flow chart for VOTE APPORTIONING at, for example, the primary computer.

The "yes" output of the computer portion B230 is coupled to the vote apportioning computer portion of ASPC, represented in FIG. 6.

Referring now to FIG. 6, a "load OCC position data" computer portion C100 is coupled to the OCC computer for loading the net OCC member firm positions into the system. A "print report" computer portion C110 prints a report which may be entitled "OCC participant position detail report" (C111) to allow for inspection of the data. A "$\Sigma$ position$_L$=$\Sigma$ position$_s$?" computer portion C120 is provided for checking whether the sum of the long positions for all participants equals the sum of the short positions of all participants. If not, the "no" output of computer portion C120 is coupled to a "reconcile positions" computer portion C121 for manually investigating and making adjustments which is then coupled to the input of the computer portion C100. The system check is repeated until the two sums are equal. The computer cannot continue its operation until this condition is met.

The factor history file C131 is the same factor history file as factor history file B201 for storing the component factors. The factor history file C131 is coupled to a "load component factor data" computer portion C130 to which the "yes" output of computer portion C120 is applied. An "assign component factors to all participant member firm positions ($F_n$)" computer portion C140 is coupled to the output of the computer portion C130 for assigning component factors to all participant positions beginning by reading the data for the first OCC participant member firm ($F_1$).

A computer portion "for all series component positions" computer portion C150 matches each participant member firm's position against the corresponding component factors for that participant's position (denoted as EQ, $Z_n$, $S_n$ and $D_n$ for the equity, ZIPS$^{SM}$, SPECS$^{SM}$ and DIVS$^{SM}$ for all series, respectively). A "is firm position=0?" computer portion C160 determines whether the participant maintains a position for a particular component. If the participant does maintain a position (that is, his position is not equal to zero), the vote apportioning system continues its operation. If the participant does not maintain a position for a particular component (that is, his position is either absent or equal to zero), the "yes" output of the computer portion C160 continues the search as an input to computer portion C140 for subsequent components.

The "no" output of the computer portion C160 is coupled to a "is position long?" computer portion C170. The "yes" output of the computer portion C170 is applied to a "net long votes firm position times component factor" computer portion C171 for multiplying the long position by the ASPC component factor.

If the position is short, the "no" output of computer portion C170 is applied to a "net short vote=firm position times component factor times (−1)" computer portion C172 for applying its output together with the output of computer portion C171 to a "all firm positions processed?" computer portion C180. A "no" output from computer portion C180 is coupled to the input of computer portion C140 to continue the previously described operations until the computer has operated for all remaining OCC participant member firms ($F_2$ through $F_n$). A "store net long and net short votes by position by firm" computer portion C190 applies its output to a firm's vote file memory storage means C191, which may be a computer disk.

The computer portion C190 also applies its output to a "print report" computer portion C200 which prints a report entitled "participant firm net vote report" as indicated by block C201. The output of computer portion C190 is coupled through the computer portion C200 to a "Σ vote$_L$=Σ votes$_s$?" computer portion C210 for determining as a system control check whether the sum of the votes for all long components equals the sum of votes for all short components. If not, the "no" output of computer portion C210 is coupled to a computer portion C211 wherein the votes are manually reconciled, adjustments made and the computer operation repeated. The computer operation cannot go forward until this condition is met.

Figure 7:
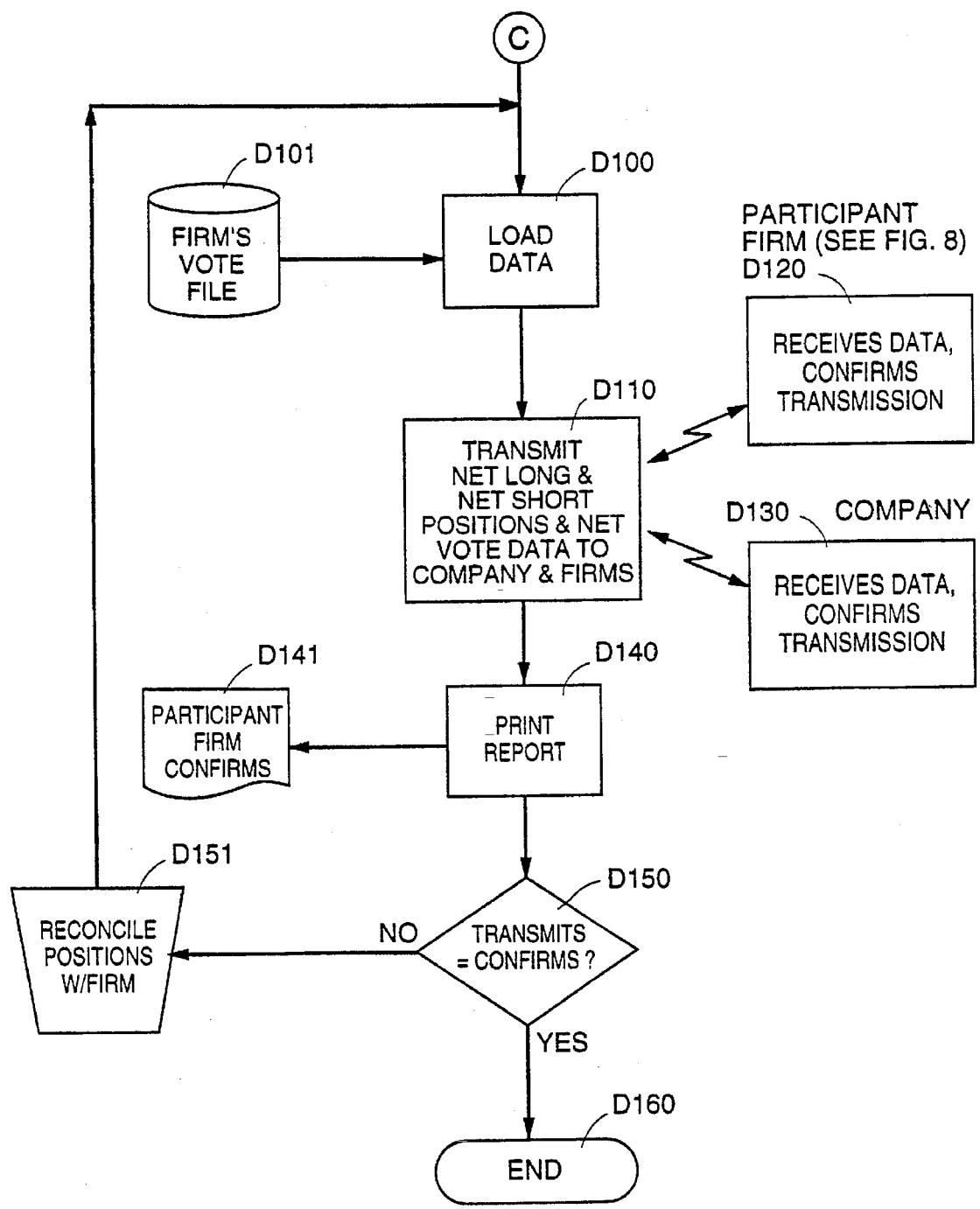
FIG. 7 is a flow chart comprising a representation of a portion of a computer which operates according to a computer program produced according to the flow chart for OCC PARTICIPANT MEMBER FIRM AND COMPANY NOTIFICATION at, for example, the primary computer.

Referring to FIG. 7 of the drawings, the OCC participant member firm's vote file D101, which may be a storage disk, is reloaded into the ASPC computer system at a "load data" computer portion D100. A "transmit net position and net vote data to company and firms" computer portion D110 transmits by telecommunications the net position and net vote data and component factor to the company as well as to each member firm maintaining any component position, as indicated by blocks D120 and D130.

The participant member firm's (D120) computer receives the data and returns confirmation of such to ASPC. This data should be in complete agreement with daily positions as reported by OCC and confirmed with the participant. As indicated by block D130, the company computer similarly receives the position and vote data and confirms such to the ASPC computer.

A "print report" computer portion D140 prints a report entitled "the participant firm confirmation report" D141 to allow for inspection of the data. A "transmits equal confirms?" computer portion D150 has a "no" output coupled to a "reconcile positions with firm" computer portion D151 for reconciling the discrepancy if the data transmitted does not agree with the confirmation for the participant firm. The computer repeats this operation until the two positions agree. The "yes" output of computer portion D150 completes the ASPC computer data processing. At this point the standard proxy solicitation process becomes operative.

Figure 8:
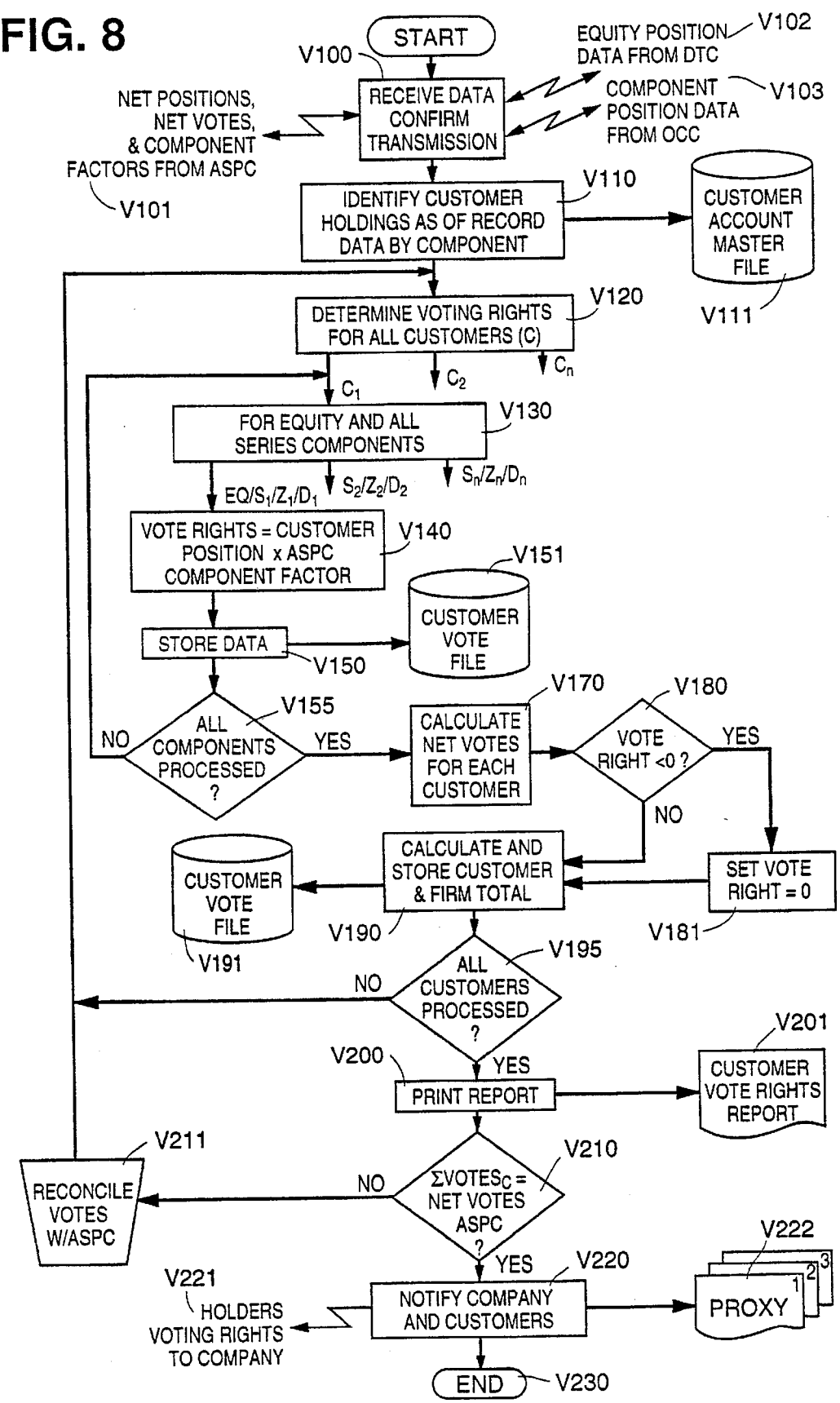
FIG. 8 is a flow chart comprising a representation of a portion of a computer which operates according to a computer program produced according to the flow chart for OCC PARTICIPANT MEMBER COMPUTER.

Referring now to FIG. 8, the OCC participant member firm computer comprises a "receive data, confirm transmission" computer portion V100 which responds to the component factors and net long and net short vote position transmitted by ASPC and sends the confirmation of such to ASPC. The participant member firm also receives and reconciles position data from OCC and DTC. An "identify customer holdings as of record date by component" computer portion V110 accesses the customer account master file V111, which may be a computer storage disk, in order to identify customers holding any of the relevant components (as identified by their CUSIP numbers) as of the assigned record date.

A "determine voting rights for all customers (C)" computer portion V120 searches each customer file (denoted $C_1$ through $C_n$) to identify component holders.

A "for equity and all series components" computer portion V130 considers only CUSIP numbers with any claim to a voting right (denoted as EQ, $Z_n$, $S_n$ and $D_n$) for the equity, ZIPS$^{SM}$, SPECS$^{SM}$ and DIVS$^{SM}$ for all series, respectively. As an eligible component is found, computer portion "vote right=customer position times ASPC component factor" computer portion V140 establishes the customer's voting right by multiplying the position by the ASPC component factor.

A "store data" computer portion V150 stores each such position in the participant member firm's customer vote file (B151), which may be a computer disk.

An "all accounts processed?" computer portion V160 has a "no" output connected to the input of computer portion V120 to repeat the computer operations until all customer accounts have been processed. The "yes" output of computer portion V160 is coupled to a "calculate net votes for each customer" computer portion V170 which tabulates the net number of votes assignable to each customer.

If the customer's net vote right is negative (less than zero), the "vote right less than 0?" computer portion V180 retains the value for reference but the eligible vote right is set to zero. As a system control check this assures that accounts maintaining a short equity position, but with a long component position, do not receive voting rights for which they are not eligible.

The "yes" output of computer portion V180 is coupled to a "set vote right=0" computer portion V181 which has its output applied to a "calculate and store firm total" computer portion V190. The computer portion V190 calculates and stores the total eligible votes for all customers and the firm total. This output is applied to a customer vote file V191, which may be a computer disk.

A "print report" computer portion V200 prints a customer vote rights report V201, to allow for inspection of the data.

The output of V190 is coupled through V200 to a "Σ votes$_c$=net votes ASPC?" which as a system control check determines whether the sum of the eligible customer votes equals the net votes assigned by ASPC. If not, any discrepancies are applied to computer portion V211 "reconcile votes with ASPC" where any discrepancies are manually reconciled by the participant firm, adjustments are made and the computer operation repeats until the amounts are equal. The computer operation cannot go forward until this condition is met.

The "yes" output of the computer portion V210 is applied to a "notify company and customers" computer portion V220, for advising the company of each participant's component holders and their component voting rights, as indicated by arrow V221. Proxies are then sent to individual customers, as indicated by V222.

Standard proxy solicitation then is made by the company.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A data processing system for processing the voting of partial stock interests via equity and options, comprising:

(a) first computer means for determining and storing a component factor for equity and for calculating and storing component factors for options and vote component factors corresponding to each of said component factors for options, wherein each said vote component factor is indicative of the right to receive a partial vote attributed to each of said component factors for options and including means for generating data indicative of a broker's component positions;

(b) said first computer means generating data for a broker's computer means showing a component factor for each of said component interests and a number of votes allocated to the broker's position in each of said component interests;

(c) a broker's computer means being responsive to said first computer means for identifying customer holdings of equity and component interests;

(d) a communications link between said first computer means and said broker's computer means for transmitting said data generated by said first computer means to said broker's computer means;

(e) a company's computer means being responsive to said first computer means for identifying component interests and votes by broker and to said broker's computer means for receiving and identifying customer votes;

(f) a communications link between said first computer means and said company's computer means for transmitting data generated by said first computer means to said company's computer means;

(g) said broker's computer means allocating votes to said customers based on said component factors for equity and options and reporting to said company's computer means the equity and the number of component interests and the number of net votes:

(h) said broker's computer means generating a proxy having indicia including votes due to equity, if any, and votes due to options of each customer.

2. A data processing system for processing the voting of partial stock interests via equity and options, comprising:

(a) control computer means for determining and storing a component factor for equity and for calculating and storing component factors for options and vote component factors corresponding to each of said component factors for options, wherein each said vote component factor is indicative of the right to receive a partial vote attributed to each of said component factors for options and including means for requesting data indicative of a broker's component positions;

(b) an option clearing corporation's computer means for generating for said control computer means data showing a broker's position in each of said component interests and including means for transmitting data indicative of the broker's position in each of said component interests;

(c) a communications link between said control computer means and said options clearing corporation's computer means for transmitting said requested data to said control computer means;

(d) said control computer means generating data for a broker's computer means showing a component factor for each of said component interests and a number of votes allocated to the broker's position in each of said component interests;

(e) a broker's computer means, being responsive to said control computer means, for identifying customer holdings of equity and component interests;

(f) a communications link between said control computer memos and said broker's computer means for transmitting said data generated by said control computer means to said broker's computer means;

(g) a company's computer means being responsive to said control computer means for identifying component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to customers based on said component factors for equity and options and reporting to said company's computer means the equity and the number of component interests and the number of net votes;

(j) said broker's computer means generating a proxy having indicia including votes due to equity, if any, and votes due to options of each customer.

3. A data processing system for processing the voting of partial stock interests via equity and options, comprising:

(a) control computer means for determining and storing a component factor for equity and for calculating and storing component factors for options and vote component factors corresponding to each of said component factors for options, wherein each said vote component factor is indicative of the right to receive a partial vote attributed to each of said component factors for options;

(b) an options clearing corporation's computer means responsive to said control computer means for generating for said control computer means data showing a broker's position in each of said component interests;

(c) a communications link between said control computer means and said options clearing corporation's computer means for transmitting data indicative of the broker's component position to said control computer means;

(d) said control computer means generating data for a broker's computer means showing a component factor for each of said component interests and a number of votes allocated to the broker's position in each of said component interests;

(e) a broker's computer means being responsive to said control computer means for identifying customer holdings of equity and component interests;

(f) a communications link between said control computer means and said broker's computer means for transmitting data generated by said control computer means to said broker's computer means;

(g) a company's computer means being responsive to said control computer means for identifying component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to customers based on said component factors for equity and options and reporting to said company's computer means the equity and the number of component interests and the number of not votes;

(j) said broker's computer means generating a proxy having indicia including votes due to equity, if any, and votes due to options of each customer.

4. A system in accordance with claim 3 in which said broker's computer means generates a proxy for each customer showing the number and type of equity and component interests, said equity and component factors, the votes due to said equity and component interests, and the net number of votes due to the customer.

5. A data processing system for processing the voting of partial stock interests via equity and options, comprising:

(a) control computer means for determining and storing a component factor for equity and for calculating and storing component factors for options and vote component factors corresponding to each of said component factors for options, wherein each said vote component factor is indicative of the right to receive a partial vote attributed to each of said component factors for options, wherein said component factors for options are at least two of:

(i) a component interest indicative of the right to receive a partial share of stock equal in value to a stipulated price or a full sham of stock of the company on a predetermined future date, whichever is the lesser value;

(ii) a component interest indicative of the right to receive a partial share of stock equal in value to the appreciation, if any, of the share of stock above the stipulated price on the predetermined date;

(iii) a component interest indicative of the right to receive substitute payments equal in amount to dividends declared with respect to a given date which is prior to the predetermined future date and which goes to zero value at the predetermined future date;

(b) an options clearing corporation's computer means responsive to said control computer means for generating for said control computer means data showing a broker's position in each of said component interests;

(c) a communications link between said control computer means and said options clearing corporation's computer means for transmitting data indicative of the broker's component position to said control computer means;

(d) said control computer means generating data for a broker's computer means showing a component factor for each of said component interests and a number of votes allocated to the broker's position in each of said component interests;

(e) a broker's computer means being responsive to said control computer means for identifying customer holdings of equity and component interests;

(f) a communications link between said control computer means and said broker's computer means for transmitting data generated by said control computer means to said broker's computer means;

(g) a company's computer means being responsive to said control computer means for identifying component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to said customers based on said component factors for equity and options and reporting to said company's computer means the equity and the number of component interests and the number of net votes;

(j) said broker's computer means generating a proxy having indicia including votes due to equity, if any, and votes due to options of each customer.

6. A system in accordance with claim 5 in which said control computer means comprises means for calculating and storing said component factors for options as of a record data for each of said component interests (i), (ii) and (iii).

7. A data processing system for processing the voting of partial stock interests via equity and options, comprising:

(a) control computer means for calculating and storing a component factor for equity and for calculating and storing component factors for options and vote component factors corresponding to each of said component factors for options, wherein each said vote component factor is indicative of the right to receive a partial vote attributed to each of said component factors for options;

(b) an options clearing corporation's computer means with associated communication means;

(c) communication means associated with said control computer means for establishing a communications link to said communications means associated with said options clearing corporation's computer means to request data showing a broker's position in each of said component interests;

(d) said options clearing corporation's computer means generating said broker's position data;

(e) said communications means associated with said options clearing corporation's computer means establishing a communications link to said control computer means and said communication means associated therewith, and said communication means delivering to said control computer means said broker's position data;

(f) said communication means associated with said control computer means acknowledging receipt of said broker position report;

(g) said control computer means generating data for a broker showing a component factor for each of said component interests and a number of votes allocated to said broker's position in each of said component interests;

(h) a broker's computer means and communication means associated therewith;

(i) said communication means associated with said control computer means establishing a communications link to said broker's communication means to transmit said broker's vote allocation data to said broker's computer, and said broker's computer means and associated communication means acknowledging receipt of said transmission;

(j) said control computer means and communication means associated therewith;

(k) a company's computer means and communication means associated therewith;

(l) said control computer means and associated communication means transmitting data representing said component interests and votes by broker to said company's computer means and said communication means associated therewith;

(m) said company's communication means acknowledging receipt of said component interests and votes by broker data;

(n) said broker's computer means generating vote allocation data for customers based on said component factors for equity and options;

(o) said broker's computer means generating a proxy having indicia including votes due to equity, if any, and votes due to options of each customer.

8. A system in accordance with claim 7 in which said communication means are telecommunication means.

9. A data processing system for processing the voting of partial stock interests via equity and options, comprising:

(a) first computer means for determining and storing a component factor for equity and for calculating and storing component factors for options and vote component factors corresponding to each of said component factors for options, wherein each said vote component factor is indicative of the right to receive a partial vote attributed to each of said component factors for options and including means for generating data indicative of a broker's component positions;

(b) said first computer means generating data for a broker's computer means showing a component factor for each of said component interests and a number of votes allocated to the broker's position in each of said component interests;

(c) a broker's computer means being responsive to said first computer means for identifying customer holdings of equity and component interests;

(d) a communications link between said first computer means and said broker's computer means for transmitting said data generated by said first computer means to said broker's computer means;

(e) a company's computer means being responsive to said first computer means for identifying component interests and votes by broker and to said broker's computer means for receiving and identifying customer votes;

(f) a communications link between said first computer means and said company's computer means for transmitting data generated by said first computer means to said company's computer means;

(g) said broker's computer means allocating votes to said customers based on said component factors for equity and options and reporting to said company's computer means the equity and the number of component interests and the number of net votes;

(h) a communications link between said broker's computer means and said company's computer means for transmitting data generated by said broker's computer means to said company's computer means;

(j) said broker's computer means generating a proxy having indicia including votes due to equity, if any, and votes due to options of each customer.

10. A data processing system for processing the voting of partial stock interests via equity and options, comprising:

(a) control computer means for determining and storing a component factor for equity and for calculating and storing component factors for options and vote component factors corresponding to each of said component factors for options, wherein each said vote component factor is indicative of the right to receive a partial vote attributed to each of said component factors for options and including means for requesting data indicative of a broker's component positions;

(b) an option clearing corporation's computer means for generating for said control computer means data showing a broker's position in each of said component interests and including means for transmitting data indicative of the broker's position in each of said component interests;

(c) a communications link between said control computer means and said options clearing corporation's computer means for transmitting said requested data to said control computer means;

(d) said control computer means generating data for a broker's computer means showing a component factor for each of said component interests and a number of votes allocated to the broker's position in each of said component interests;

(e) a broker's computer means, being responsive to said control computer means, for identifying customer holdings of equity and component interests;

(f) a communications link between said control computer means and said broker's computer means for transmitting said data generated by said control computer means to said broker's computer means;

(g) a company's computer means being responsive to said control computer means for identifying component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to customers based on said component factors for equity and options and reporting to said company's computer means the equity and the number of component interests and the number of net votes;

(j) a communications link between said broker's computer means and said company's computer means for transmitting data generated by said broker's computer means to said company's computer means;

(k) said broker's computer means generating a proxy having indicia including votes due to equity, if any, and votes due to options of each customer.

11. A data processing system for processing the voting of partial stock interests via equity and options, comprising:

(a) control compute means for determining and storing a component factor for equity and for calculating and storing component factors for options and vote component factors corresponding to each of said component factors for options, wherein each said vote component factor is indicative of the right to receive a partial vote attributed to each of said component factors for options;

(b) an options clearing corporation's computer means responsive to said control computer means for generating for said control computer means data showing a broker's position in each of said component interests;

(c) a communications link between said control computer means and said options clearing corporation's computer means for transmitting data indicative of the broker's component position to said control computer means;

(d) said control computer means generating data for a broker's computer means showing a component factor for each of said component interests and a number of votes allocated to the broker's position in each of said component interests;

(e) a broker's computer means being responsive to said control computer means for identifying customer holdings of equity and component interests;

(f) a communications link between said control computer means and said broker's computer means for transmitting data generated by said control computer means to said broker's computer means;

(g) a company's computer means being responsive to said control computer means for identifying component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to customers based on said component factors for equity and options and reporting to said company's computer means the equity and the number of component interests and the number of net votes;

(j) a communications link between said broker's computer means and said company's computer means for transmitting data generated by said broker's computer means to said company's computer means;

(k) said broker's computer means generating a proxy having indicia including votes due to equity, if any, and votes due to options of each customer.

12. A system in accordance with claim 11 in which said broker's computer means generates a proxy for each customer showing the number and type of equity and component interests, said equity and component factors, the votes due to said equity and component interests, and the net number of votes due to the customer.

13. A data processing system for processing the voting of partial stock interests via equity and options, comprising:

(a) control computer means for determining and storing a component factor for equity and for calculating and goring component factors for options and vote component factors corresponding to each of said component factors for options, wherein each said vote component factor is indicative of the right to receive a partial vote attributed to each of said component factors for options, wherein said component factors for options are at least two of:

(i) a component interest indicative of the right to receive a partial share of stock equal in value to a stipulated price or a full share of stock of the company on a predetermined future date, whichever is the lesser value;

(ii) a component interest indicative of the right to receive a partial share of stock equal in value to the appreciation, if any, of the share of stock above the stipulated price on the predetermined date;

(iii) a component interest indicative of the right to receive substitute payments equal in mount to dividends declared with respect to a given date which is prior to the predetermined future date and which goes to zero value at the predetermined future date;

(b) an options clearing corporation's computer means responsive to said control computer means for generating for said control computer means data showing a broker's position in each of said component interests;

(c) a communications link between said control computer means and said options clearing corporation's computer means for transmitting data indicative of the broker's component position to said control computer means;

(d) said control computer means generating data for a broker's computer means showing a component factor for each of said component interests and a number of votes allocated to the broker's position in each of said component interests;

(e) a broker's computer means being responsive to said control computer means for identifying customer holdings of equity and component interests;

(f) a communications link between said control computer means and said broker's computer means for transmitting data generated by said control computer means to said broker's computer means;

(g) a company's computer means being responsive to said control computer means for identifying component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to said customers based on said component factors for equity and options and reporting to said company's computer means the equity and the number of component interests and the number of net votes;

(j) a communications link between said broker's computer means and said company's computer means for transmitting data generated by said broker's computer means to said company's computer means;

(k) said broker's computer means generating a proxy having indicia including votes due to equity, if any, and votes due to options of each customer.

14. A system in accordance with claim 13 in which said control computer means comprises means for calculating and storing said component factors for options as of a record data for each of said component interests (i), (ii) and (iii).

15. A data processing system for processing the voting of partial stock interests via equity and options, comprising:

(a) control computer means for calculating and storing a component factor for equity and for calculating and storing component factors for options and vote component factors corresponding to each of said component factors for options, wherein each said vote component factor is indicative of the right to receive a partial vote attributed to each of said component factors for options;

(b) an options clearing corporation's computer means with associated communication means;

(c) communication means associated with said control computer means for establishing a communications link to said communications means associated with said options clearing corporation's computer means to request data showing a broker's position in each of said component interests;

(d) said options clearing corporation's computer means generating said broker's position data;

(e) said communications means associated with said options clearing corporation's computer means establishing a communications link to said control computer means and said communication means associated therewith, and said communication means delivering to said control computer means said broker's position data;

(f) said communication means associated with said control computer means acknowledging receipt of said broker position report;

(g) said control computer means generating data for a broker showing a component factor for each of said component interests and a number of votes allocated to said broker's position in each of said component interests;

(h) a broker's computer means and communication means associated therewith;

(i) said communication means associated with said control computer means establishing a communications link to said broker's communication means to transmit said broker's vote allocation data to said broker's computer, and said broker's computer means and associated communication means acknowledging receipt of said transmission;

(j) said control computer means and communication means associated therewith;

(k) a company's computer means and communication means associated therewith;

(l) said control computer means and associated communication means transmitting data representing said component interests and votes by broker to said company's computer means and said communication means associated therewith;

(m) said company's communication means acknowledging receipt of said component interests and votes by broker data;

(n) said broker's computer means generating vote allocation data for customers based on said component factors for equity and options;

(o) said broker's communications means transmitting said vote allocation data for customers to said company's communication means;

(p) said company's communications means acknowledging receipt of said vote allocation data for customers;

(q) said broker's computer means generating a proxy having indicia including votes due to equity, if any, and votes due to options of each customer.

16. A system in accordance with claim 15 in which said communication means are telecommunication means.

* * * * *